United States Patent [19]

Liu et al.

[11] Patent Number: 5,273,628

[45] Date of Patent: Dec. 28, 1993

[54] MIXED IONIC-ELECTRONIC CONDUCTORS FOR OXYGEN SEPARATION AND ELECTROCATALYSIS

[75] Inventors: Meilin Liu; Ashok V. Joshi; Yousheng Shen, all of Salt Lake City, Utah; Kevin Krist, Palatine, Ill.

[73] Assignee: Gas Research Institute, Chicago, Ill.

[21] Appl. No.: 882,175

[22] Filed: May 11, 1992

[51] Int. Cl.$^5$ .................. C25B 1/02; C25B 13/04
[52] U.S. Cl. .................. 204/59 R; 204/296;
204/283; 252/518; 252/519; 252/520; 252/521;
429/33; 501/103; 501/123; 501/126; 501/134;
501/152
[58] Field of Search .............. 204/295, 291, 284, 421,
204/59; 252/518, 519, 520, 521; 429/33;
501/103, 123, 126, 134, 152; 210/500.1, 500.21;
55/2

[56] References Cited

U.S. PATENT DOCUMENTS

| | | | |
|---|---|---|---|
| 3,956,194 | 5/1976 | Armand | 252/507 |
| 4,793,904 | 12/1988 | Mazanec et al. | 204/59 R |
| 4,802,958 | 2/1989 | Mazanec et al. | 204/80 |
| 4,803,134 | 2/1989 | Sammells | 429/16 |
| 4,812,329 | 3/1989 | Isenberg | 427/115 |
| 4,931,214 | 6/1990 | Worrell et al. | 252/520 |
| 4,933,054 | 6/1990 | Mazanec et al. | 204/80 |
| 5,006,494 | 4/1991 | Virkar | 501/152 |

FOREIGN PATENT DOCUMENTS 0399194 5/1990 European Pat. Off.

OTHER PUBLICATIONS

Liu, Electrode Kinetics and Transport Properties of Mixed Ionic-Electronic Conductors; Proceedings of the First International Symposium on Ionic and Mixed Conducting Ceramics; vol. 91-12; 12-91 pp. 191-215.

Liu et al, Characterization of Mixed Ionic-Electronic Conductors, Proceedings of the First International Symposium on Ionic and Mixed Conducting Ceramics; vol. 91-12; pp. 231-247; 12-91.

Worell, Electrical Properties of Mixed-Conducting Oxides Having High Oxygen-Ion Conductivity; pp. 147-151; 1991.

M. J. Verkerk and A. J. Burggraaf, "High Oxygen Ion Conduction in Sintered Oxides of the Bi2O3-Dy2O3 System", J. Electrochem. Soc., 128, No. 1, 75-82 (1981).

P. J. Dordor, J. Tanaka and A. Watanabe, "Electrical Characterization of Phase Transition In Yttrium Doped Bismuth Oxide, Bi1.55Y0.45O3", Solid State Ionics, 25, 177-181, (1987).

H. T. Cahen, T. G. M. Van Den Belt, J. H. W. De Wit and G. H. J. Broers, "The Electrical Conductivity of —Bi2O3 Stabilized By Isovalent Rare-Earth Oxides R2O3", Solid State Ionics, 1, 411-423, (1980).

H. T. Cahen, J. H. W. De Wit, A. Honders, G. H. J. Broers and J. P. M. Van Den Dungen, "Thermogalvanic Power And Fast Ion Conduction In —Bi2O3 And —(Bi2O3)1—x(R2O3)x With R=Y, Tb-Lu", Solid State Ionics, 1, 4250440, (1980).

H. Iwahara, T. Esaka, T. Sato and T. Takahashi, J., "Formation of High Oxides Ion Conductive Phases in the Sintered Oxides of the System Bi2O3-La2)3 System Bi2O3-Ln2O3 (Ln=La-Yb)", Solid State Chem., 39, 173-180, (1981).

M. J. Verkerk and A. J. Burggraaf, "High Oxygen Ion Conduction In Sintered Oxides Of The Bi2O3-La2O3 System", Solid State Ionics, 3/4, 463-467, (1981).

Primary Examiner—Kathryn Gorgos
Attorney, Agent, or Firm—Speckman, Pauley & Fejer

[57] ABSTRACT

Mixed oxygen ion and electronic conducting bismuth oxide based ceramic materials having high ambipolar activity which can be fabricated into thin membranes for high efficiency oxygen separation from air at intermediate temperatures. The ceramic materials may be homogeneous microstructures in the form of solid solutions or compounds or may be composite non-homogeneous microstructures of a separate substantially continuous oxygen ion conductive phase and a substantially continuous electronic conductive phase.

34 Claims, 5 Drawing Sheets

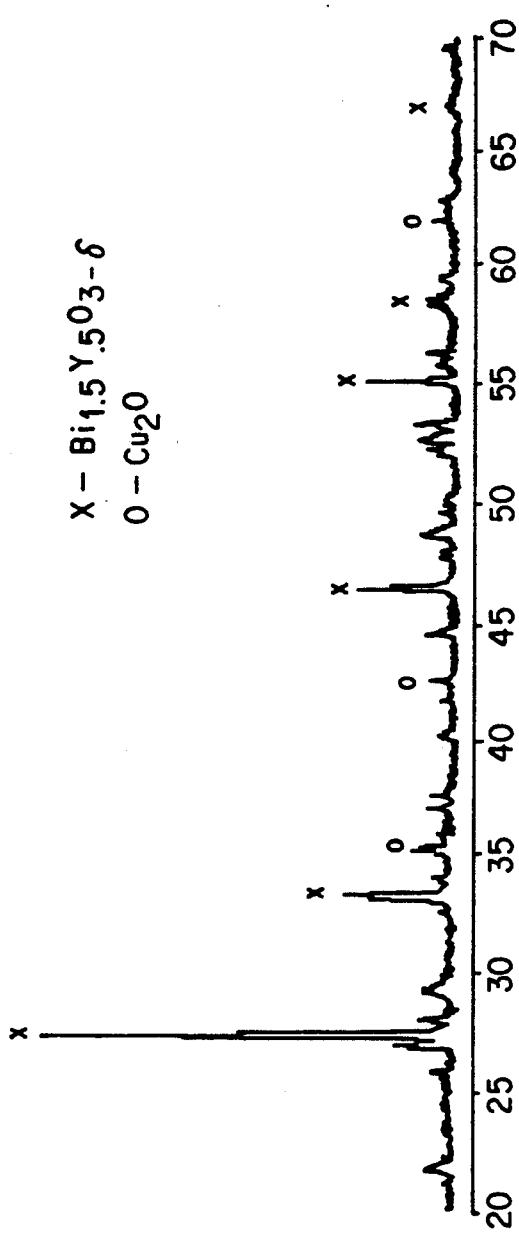

MIXED IONIC-ELECTRONIC CONDUCTORS FOR OXYGEN SEPARATION AND ELECTROCATALYSIS

BACKGROUND OF THE INVENTION

1. Field of The Invention

This invention relates to ceramic materials which may be fabricated in membrane form and have properties of mixed ionic-electronic conductors useful for separation of oxygen from air and for electrocatalysis.

2. Description of Related Art

Much prior work has centered around stabilizing and increasing oxygen ion conduction of materials such as $Bi_2O_3$. High oxygen ion conduction compared to that of zirconia based electrolytes has been obtained using $Bi_2O_3$ doped with $Er_2O_3$ or $Tm_2O_3$, M. J. Verkerk and A. J. Burggraaf, J. Electrochem. Soc., 128, No. 1, 75–82 (1981), and using $Bi_2O_3$ doped with yttrium, P. J. Dordor, J. Tanaka and A. Watanabe, Solid State Ionics, 25, 177–181, (1987), and using $Bi_2O_3$ doped with $Yb_2O_3$, H. T. Cahen, T. G. M. Van Den Belt, J. H. W. De Wit and G. H. J. Broers, Solid State Ionics, 1, 411–423, (1980). Increasing oxygen ion conductivity and structural stabilization of the FCC phase of $Bi_2O_3$ based electrolytes has been investigated resulting in fast ion conduction in $Bi_2O_3$ doped with oxides of Y and Tb-Lu, H. T. Cahen, J. H. W. De Wit, A. Honders, G. H. J. Broers and J. P. M. Van Den Dungen, Solid State Ionics, 1, 4250440, (1980), and $Bi_2O_3$ doped with oxides of La, Nd, Sm, Dy, Er or Yb, H. Iwahara, T. Esaka, T. Sato and T. Takahashi, J. Solid State Chem., 39, 173–180, (1981), and $Bi_2O_3$ doped with oxides of Er and Dy, M. J. Verkerk and A. J. Burggraaf, Solid State Ionics, 3/4, 463–467, (1981). U.S. Pat. No. 5,006,494 teaches oxygen ion conductivity of $Bi_2O_3$ in the cubic form stabilized by 10–40 mole percent of a rare earth oxide such as yttria is greatly enhanced by inclusion of up to 10 mole percent of an oxide of a cation having a valence of 4 or greater, such as zirconia, hafnia, thoria, stannic oxide, tantalum oxide, and niobium oxide.

Mixed ionic-electronic conductors have been disclosed as solid electrolyte materials and for electrocatalysis: U.S. Pat. No. 4,793,904 teaches conversion of light hydrocarbons to synthesis gas using a solid electrolyte having a conductive metal or metal oxide coating on the cathode side which is capable of reducing oxygen to oxygen ions and a conductive coating on the anode side capable of catalyzing the oxidative conversion of methane or natural gas to synthesis gas with the solid electrolyte being a high ionic conductive material, preferably yttria or calcia stabilized zirconia, while also disclosing $Bi_2O_3$ stabilized by a lanthanide or calcium oxide; U.S. Pat. No. 4,933,054 teaches electrocatalytic oxidative conversion of saturated hydrocarbons to unsaturated hydrocarbons in an electrogenerative cell using a solid electrolyte having a conductive coating on each side, teaching the coating on anode side may be bismuth and preferably mixtures of silver and bismuth, with the solid electrolyte being a high ionic conductive material, preferably yttria or calcia stabilized zirconia, while also disclosing $Bi_2O_3$ stabilized by a lanthanide or calcium oxide; U.S. Pat. No. 4,802,958 teaches electrocatalytic conversion of low molecular weight hydrocarbons to higher molecular weight hydrocarbons in an electrogenerative cell using a solid electrolyte coated with a metal or metal oxide coating on each side as taught in the '054 patent, the conductive metal or metal oxide coating on the cathode side being one capable of reducing oxygen to oxygen ions and the conductive metal or metal oxide coating on the anode side being capable of catalyzing the conversion of low molecular weight hydrocarbons to higher molecular weight hydrocarbons including bismuth and preferably mixtures of bismuth and silver; and U.S. Pat. No. 4,812,329 teaches a coating of oxygen-ionic-electronic conducting cerium and uranium oxide undoped or, preferably, doped with zirconia, thoria, or lanthanum oxides on cermet electrodes to provide electronic conduction for solid oxide electrochemical cells European Patent Publication No. 0 399 833 teaches multi-phase mixtures of an electronically conductive material and an oxygen ion conductive material and solid membranes based upon $ABO_3$ perovskite materials, preferably containing small amounts or no bismuth.

Mixed ionic and electronic conducting oxidic materials based upon 25 to 98 mole percent cubic or tetragonal $ZrO_2$, 1.5 to 15 mole percent stabilizing oxide of alkaline earth metals, yttrium and/or rare earth metals, particularly oxides of Ca, Mg, Y, and 0.5 to 50 mole percent oxide V, Nb, Ta, Cr, Mb, W and/or Ti with usual impurities are taught by U.S. Pat. No. 4,931,214 to provide high current densities, operate at lower temperatures than present materials, provide conductivity independent of oxygen pressure and are useful in oxygen concentration cells, oxygen probes, fuel cells, and electrolysis cells. U.S. Pat. No. 3,956,194 teaches mixed electronic and ionic conductors for positive electrodes of electrochemical generators which are monophased graphite material having an alkali cation of Li, Na, K, Rb, Cs, or $NH_4$, a transition metal of Ti, V, Cr, Mn, Fe or Mo, and a non-metallic electronegative atom of O, S, F, Cl or Br.

SUMMARY OF THE INVENTION

It is an object of this invention to provide mixed oxygen ion and electronic conducting bismuth oxide based ceramic materials having higher ambipolar conductivity and lower temperature operation than previously available materials.

It is an object of this invention to provide mixed oxygen ion and electronic conductors as a homogeneous microstructure in the form of solid solutions or compounds of bismuth oxide doped with an impurity dopant which functions both as a stabilizer and to create ion defects in the lattice and a variable valence dopant to create electronic defects.

It is yet another object of this invention to provide mixed oxygen ion and electronic conductors as a bismuth oxide based composite non-homogeneous microstructure of a separate substantially continuous oxygen ion conductive phase and electronic conductive phase.

It is still another object of this invention to provide a bismuth oxide based mixed oxygen ion and electronic conductor ceramic membrane for high efficiency separation of oxygen from mixed gases, such as air.

It is another object of this invention to provide a mixed oxygen ion and electronic conducting bismuth oxide based ceramic material having high ambipolar conductivity for use in fuel cells, sensors, co-generation systems, electrosynthesis, and other solid state electrochemical processes utilizing mixed oxygen ion and electronic conduction.

This invention relates to materials having high ambipolar conductivity at desired process temperatures.

Ambipolar conductivity, which has a strong influence on the rate of oxygen separation, depends upon the correct combination of ionic and electronic conductivity to result in high ambipolar conductivity, as more fully described in M. Liu, Electrode Kinetics and Transport Properties of Mixed Ionic-Electronic Conductors, Proceedings of the First International Symposium on Ionic and Mixed Conducting Ceramics, Edited by T. A. Ramanarayanan and H. L. Tuller, Proc. Vol. 91-12, 191-215, The Electrochemical Society, Pennington, N.J., (1991) incorporated herein in its entirety by reference. As pointed out in the prior art, rare earth or alkaline earth metal oxide stabilized bismuth oxide has exhibited high ionic conductivity. However, use of these materials has been limited by their thermodynamic instability in a reducing environment or in an inert atmosphere with low partial pressure of oxygen.

We have found that mixed oxygen ion and electronic conducting bismuth oxide based materials which have high ambipolar conductivity and are suitable for oxygen separation at intermediate temperatures may be achieved by variable-valence-impurity-doped bismuth oxide based materials having a homogeneous microstructure of a solid solution or a compound and by a composite non-homogeneous physically mixed microstructure of a substantially continuous oxygen ion conducting bismuth oxide based phase of about 50 to about 95 volume percent and a substantially continuous electronic conducting phase of about 5 to about 50 volume percent of at least one metal, at least one metal oxide, or at least one perovskite material and mixtures thereof electronically conductive and chemically inert to the oxygen ion conducting bismuth oxide based phase.

The homogeneous microstructure material is suitably a solid solution or a compound having the chemical formulation $Bi_{2-x-y}M'_xM_yO_{3-\delta}$ wherein M' is selected from the group consisting of Er, Y, Tm, Yb, Tb, Lu, Nd, Sm, Dy, Zr, Hf, Th, Ta, Nb, Pb, Sn, In, Ca, Sr, La and mixtures thereof; M is selected from a variable valence metal and mixtures thereof; x is a number of 0.0 to a positive number of about 0.6; y is a positive number of about 0.02 to about 0.4; and $\delta$ is a number of 0 to a positive or negative number of about 0.3 to satisfy valence requirements.

The mixed oxygen ion and electronic conducting bismuth oxide based materials of this invention and mixed oxygen ion and electronic conducting cerium oxide based materials may be fabricated into gas impervious ceramic membranes for oxygen ion transport. These mixed oxygen ion and electronic conducting gas impervious ceramic membranes have high ambipolar conductivity for oxygen ion transport and may be used for oxygen separation from an oxygen containing gas by contacting one side of the ceramic membrane with an oxygen containing gas concurrently with withdrawing oxygen from the second opposite side of the membrane. Oxygen separation from gas mixtures using mixed oxygen ion and electronic conducting bismuth oxide based or cerium oxide based ceramic membranes may be achieved at relatively low pressure differentials and intermediate temperatures providing enhanced separation efficiency and reduced operating costs. High ambipolar conductivity and high catalytic activity of these ceramic materials render them especially suitable for catalysis of electrochemical reactions, electrosynthesis and electrolysis applications.

BRIEF DESCRIPTION OF THE DRAWING

The above and further objects and advantages of the invention will become apparent upon reading the detailed description of preferred embodiments and reference to the drawing, wherein:

FIGS. 1 through 4 are X-ray diffraction data showing substitution of M and M' into the lattice of bismuth oxide based material resulting in a uniform solid solution homogeneous microstructure according to this invention;

DESCRIPTION OF PREFERRED EMBODIMENTS

Figure 3:
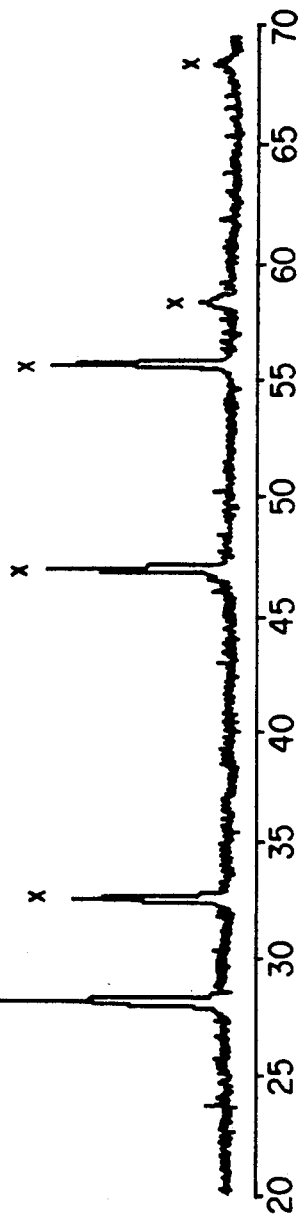

Mixed oxygen ion and electronic conducting ceramic materials resulting from combination of materials having oxygen ion and electronic conductivity in a manner which results in high ambipolar conductivity at desired process temperatures (M. Liu, supra) are achieved by this invention. The ambipolar conductivity, or the ambipolar diffusivities of oxygen in the mixed oxygen ion and electronic conducting bismuth oxide based ceramic materials of this invention are more than two times, and generally more than ten or a hundred times, greater than mixed oxygen ion and electronic conductors reported in the prior literature. The ambipolar conductivity in $Ohm^{-1}cm^{-1}$ at 750° C. for bismuth oxide based $Bi_{1.5}Y_{0.3}Cu_{0.2}O_{3-\delta}$ is $7 \times 10^{-2}$ and for $(Bi_{1.5}Y_{0.5}O_{3-\delta})_{90.0vol.\%}(Ag)_{10vol.\%}$ is $6.7 \times 10^{-2}$ while much lower values obtained under similar conditions have been reported for mixed conductors in the literature: $La_{0.89}Sr_{0.1}MnO_{3-\delta}$ is $5 \times 10^{-4}$; $La_{0.5}Sr_{0.5}MnO_{3-\delta}$ is $3 \times 10^{-3}$; and $La_{0.2}Sr_{0.8}Co_{0.8}Fe_{0.2}O_{3-\delta}$ is $3 \times 10^{-2}$. W. L. Worell, Electrical Properties of Mixed-conducting Oxides Having High Oxygen-ion Conductivity, Solid State Ionics, Elsevier Science Publishers B.V. (1992) It is desired that the mixed oxygen ion and electronic conducting material of this invention have ambipolar conductivities of greater than about $5 \times 10^{-2}$ $Ohm^{-1}cm^{-1}$ at about 750° C.

The mixed oxygen ion and electronic conducting bismuth oxide based ceramic material of this invention having high ambipolar conductivity and a homogeneous microstructure of a solid solution or compound has the chemical formulation $Bi_{2-x-y}M'_xM_yO_{3-\delta}$ wherein M' is selected from the group consisting of Er, Y, Tm, Yb, Tb, Lu, Nd, Sm, Dy, Zr, Hf, Th, Ta, Nb, Pb, Sn, In, Ca, Sr, La and mixtures thereof; M is selected from a variable valence metal and mixtures thereof; x is a number of 0.0 to a positive number of about 0.6; y is a positive number of about 0.02 to about 0.4; and $\delta$ is a number of 0 to a positive or negative number of about 0.3 to satisfy valence requirements. In preferred embodiments, M' is selected from Er, Y and mixtures thereof and x is a positive number of about 0.2 to about 0.5. In preferred embodiments, M is selected from Ti, V, Cr, Mn, Fe, Co, Ni, Cu and mixtures thereof and in particularly preferred embodiments, M is selected from Cu, Ti, Fe, Mn, V and mixtures thereof, and y is a positive number of about 0.02 to about 0.3.

The homogeneous microstructure materials of a solid solution or a compound may be produced by various methods known to the art for production of ceramics. One method of production is mixing desired proportions of metal oxides followed by calcining at sufficiently high temperature and for sufficient time to obtain the desired crystal structure or phase which may be verified by x-ray diffraction. The material may then be ball milled down to a particle size of about 0.5 to 1 micron. A slurry is formed to which 1% of organic binder may be added and mixed by milling followed by drying. The powder may be screened through a #60 mesh screen and formed into the desired shape or form by pressing. Membranes may be in a variety of forms, such as, sheets, wafers, tubes, honeycombs, thin films or other shapes, for example pellets may be formed by uniaxial and isostatic pressing or tubes may be formed by isostatic pressing. Another method is to tape cast a slurry of the fine ceramic powder into films or membranes. The green parts are then sintered in air at sufficiently high temperature and for sufficient time to result in a density of greater than 95% of the theoretical value to avoid appreciable passage of molecular sized material through the membrane. A substantially gas impermeable membrane is required which has a homogeneous microstructure.

Another suitable mixed oxygen ion and electronic conducting bismuth oxide based ceramic material having high ambipolar conductivity according to this invention is a non-homogeneous physically mixed microstructure material having a continuous oxygen ion conducting bismuth oxide based phase of about 50 to about 95 volume percent and a substantially continuous electronic conducting phase of about 5 to about 50 volume percent selected from the group consisting of at least one metal, at least one metal oxide, at least one perovskite type material and mixtures thereof electronically conductive and chemically inert to the oxygen ion conducting bismuth oxide based phase. A preferred bismuth oxide based phase is $Bi_{2-x}M'_xO_{3-\delta}$, wherein M', x and δ have the meanings set forth above. In preferred embodiments the oxygen ion conducting bismuth oxide based phase is present in about 80 to about 90 volume percent and the electronic conducting phase is present in about 10 to 20 volume percent. It is preferred that the electronic conducting phase be a metal selected from Ag, Ir, Pd, Pt, Au, Ag-Pd alloys and mixtures thereof; an electronically conductive metal oxide of $CrO_2$, $IrO_2$, $MnO_2$, $MoO_2$, $OsO_2$, $ReO_2$, $RhO_2$, $RuO_2$, $WO_2$, $VO_2$ and mixtures thereof; or is an electronically conductive perovskite material selected from $La_{1-z}Sr_zCoO_{3-\delta}$, $La_{1-z}SrMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and δ is a number of 0 to a positive or negative number of about 0.3 to satisfy valence requirements. By the terminology "derivative forms", we to include the above perovskite materials which have been modified by adding a small amount of additional additives or dopants while maintaining the original structure. In preferred embodiments, z is a positive numeral of about 0.05 to about 0.2 and w is a positive numeral of about 0.05 to about 0.2.

Figure 5:
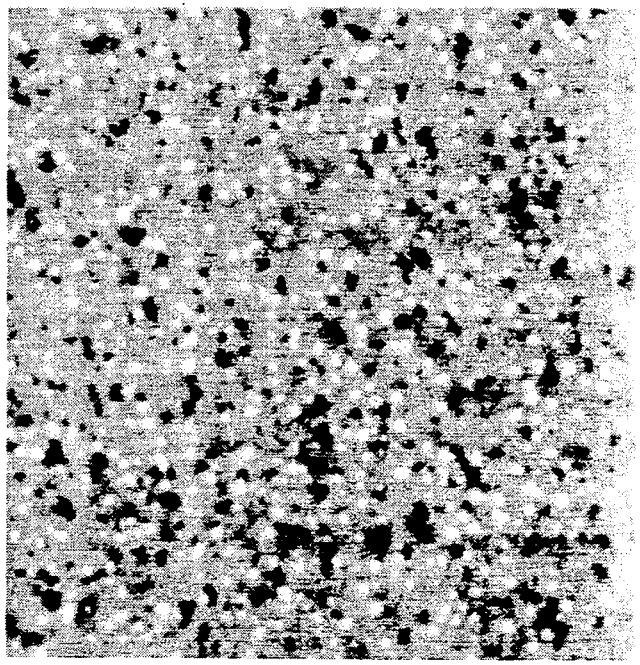
FIG. 5 is a photomicrograph of a non-homogeneous mixed microstructure according to this invention.

The microstructure of the composite non-homogeneous physically mixed material should have uniform distribution of the two phases; one being oxygen ion conductive and the other being electronically conductive. Each phase should be substantially continuous and be made up of particles with diameters of less than about 2 microns. The two phases are desirably substantially chemically inert to each other and no other phases are present at the phase boundaries or elsewhere in the composite. FIG. 5 is a photomicrograph of the mixed microstructure $(Bi_{1.5}Y_{0.5}O_{3-\delta})_{90 vol.\%}$ and $Ag_{10 vol.\%}$ sintered at 780° C. showing the bismuth oxide based matrix phase as dark and the secondary silver phase as light.

The non-homogeneous microstructure materials of this invention may be produced by various methods known to the art. One method of production is mixing desired proportions of oxide of bismuth and oxide of yttrium and calcining at sufficiently high temperature and for sufficient time to obtain yttria-stabilized bismuth oxides which may be verified by x-ray diffraction. The yttria-stabilized bismuth oxides calcined powder is mixed with the desired volume percentage of $Ag_2O$ powder and ball-milled down to a particle size of about 0.5 to about 1 micron. A slurry is formed, mixed, dried, screened, formed into desired shape, and the green material sintered as described above.

Mixed oxygen ion and electron conducting gas impervious ceramic membranes having a thickness of about 1 to about 2000 microns, preferably about 1 to about 1000 microns and most preferably about 1 to about 50 microns, may be formed having either the homogeneous or the non-homogeneous microstructure described above. By the term "membranes", we mean to include thin sheets and the material formed into any desired shape, such as tubes, honeycombs, and the like for use in a wide variety of apparatus for oxygen separation and for catalysis.

Figure 6:
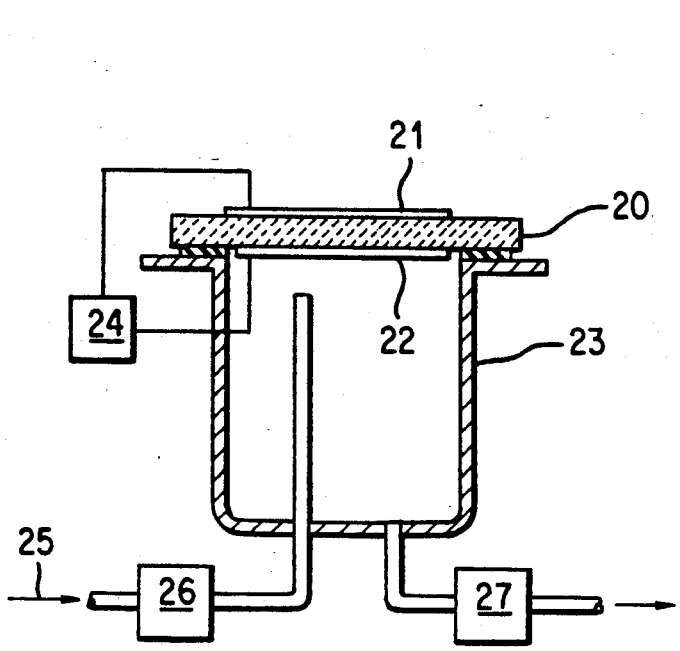
FIG. 6 is a schematic showing of an apparatus for measurement of permeation current of a ceramic membrane according to this invention.

Oxygen permeation of a mixed oxygen ion and electronic conducting membrane can be computed from measurements obtained from an apparatus as shown schematically in FIG. 6. The apparatus is suitable for permeation measurement, potentiometry, impedance spectroscopy, and for partial conductivity measurement under the restricted condition ($\Delta\Phi=0$ and $\Delta\Phi=EN$). For permeation measurements, electrodes are not required, while for impedance measurements chemical potential gradient is not necessary. FIG. 6 shows gas impermeable vessel 23 with mixed oxygen ion and electronic conductor 20 sealed across its open end with a porous electrode 22 on one side facing the vessel and porous electrode 21 on the opposite side. Electrodes 21 and 22 are connected to potentiostat 24 for electrical measurements. Pressurized mixed gas containing oxygen is supplied by supply means 25 through oxygen analyzer and flow meter 26 to vessel 23. The outgoing gas stream from vessel 23 is measured by oxygen analyzer and flow meter 27. When a mixed oxygen ion and electronic conductor is exposed to a chemical potential gradient and the external circuit is open, the ambipolar diffusion current density is generally described by $$-j_i = j_o = (\sigma_{amb}/L)[(RT/4F)ln(P_{O_2}/P'_{O_2}) - (\eta_a - \eta_c)]$$

where the ambipolar conductivity is given by $\sigma_{amb} = [-(\sigma_o\sigma_e)/(\sigma_o+\sigma_e)] + [(\sigma'_o-\sigma_0)/(1-(\sigma_{o'}-\sigma_0)/\sigma_e)]\sigma_0$ is the ionic conductivity of the mixed conductor; $\sigma_e$ is the electronic conductivity of the mixed conductor; L is thickness of the mixed conductor; $(RT/4F)\ln(P_{O_2}/P_{O_2})$ is the Nernst potential across the mixed conductor wherein R is the universal gas constant, T is temperature in Kelvin, F is Faraday's constant, and $P_{O_2}$ is the partial pressure of oxygen in contact with the mixed conductor; $\eta_a$ and $\eta_c$ are interfacial overpotentials due to electrode kinetics and interfacial mass transfer. The ionic current (Amp./cm$^2$) flowing through the mixed conductor can be calculated from the observed molar flux of oxygen as follows $$j_o = 85.59(\nu_2\chi_2 - \mu_1\chi_1)/T_1$$

where $\nu_1$ and $\nu_2$ are flow rates (cm$^3$min$^{-1}$) of the incoming and outgoing gas stream, respectively, as measured at temperature $T_1$ in Kelvin wherein $\chi_1$ and $\chi_2$ are the molar fraction of oxygen in the incoming and the outgoing gas stream, respectively. The bases for these calculations and the meanings of the symbols is set forth more completely in M. Liu and A. Joshi, Characterization of Mixed-Ionic-Electronic Conductors, Proceedings of the First International Symposium on Ionic and Mixed Conducting Ceramics, Edited by T. A. Ramanarayanan and H. L. Tuller, Proc. Vol. 91-12, 231-246, The Electrochemical Society, Pennington, N.J., (1991) incorporated herein in its entirety by reference.

Figure 7:
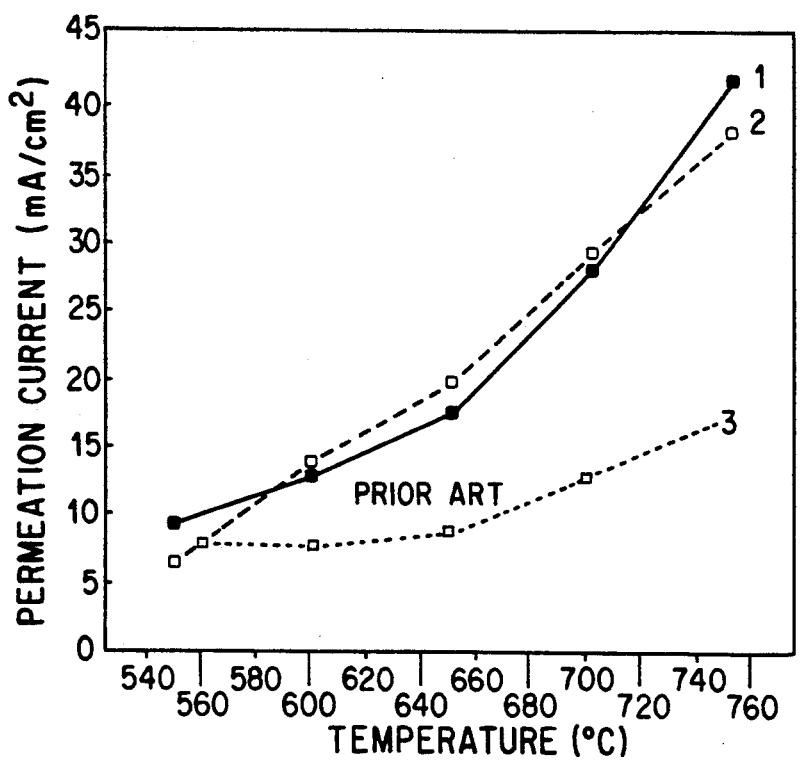
FIG. 7 is a graph comparing permeation current of ceramic membranes according to this invention with prior art materials.

FIG. 7 shows oxygen permeation rates obtained at specified temperatures with 5 mm thick pellets of specified ceramic materials using the apparatus as shown in FIG. 6 with silver electrodes. The line denoted as 3 was obtained using a prior art perovskite material $La_{0.2}Sr_{0.8}Co_{0.8}Fe_{0.2}O_{3-\delta}$ while the line denoted as 1 was obtained using the homogeneous microstructure material $Bi_{1.5}Y_{0.3}Cu_{0.2}O_{3-\delta}$ and the line denoted as 2 was obtained using the non-homogeneous physically mixed microstructure material $(Bi_{1.5}Y_{0.5}O_{3-\delta})_{90vol.\%}(Ag)_{10vol.\%}$, the latter two materials being within the present invention. Clearly, the oxygen permeation rates of the bismuth oxide based materials of this invention are much higher than prior art mixed conductors reported in the literature known to the inventors. This is the first time, known to the inventors, that significant electronic conductivity has been introduced to bismuth oxide based materials to form mixed oxygen ion and electronic conductive ceramic materials exhibiting high ambipolar conductivity.

Ceramic membranes having a homogeneous microstructure of a solid solution or compound for mixed oxygen ion and electronic conduction having high ambipolar conductivity for oxygen ion transport may also be obtained using a cerium oxide based ceramic material having a chemical formulation of $Ce_{2-x-y}M'_xM_yO_{4-\delta}$ wherein M', M, x, y and $\delta$ have the same meaning as set forth above with respect to the bismuth oxide based ceramic materials. We have found that while cerium oxide based materials used in membranes according to this invention exhibit oxygen ion transport much higher than prior art materials used for oxygen ion transport, the bismuth oxide based membranes have generally exhibited even higher oxygen ion transport.

Figure 8:
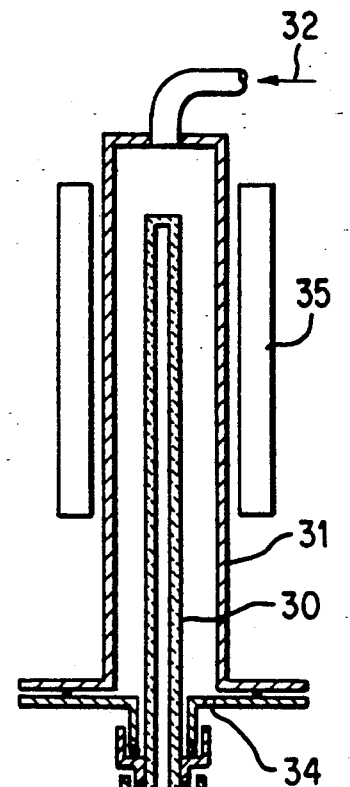
FIG. 8 is a schematic showing of an apparatus for measurement of oxygen separation from air through a ceramic membrane according to this invention.

FIG. 8 is a schematic showing of an apparatus for oxygen separation from a mixed gas containing oxygen. Tubular shaped mixed oxygen ion and electronic conductor 30 extends within gas tight vessel 31. Mixed gas containing oxygen, such as air, is supplied to vessel 31 from any appropriate supply means 32. The mixed gas is maintained under desired pressure of about 25 to about 200 psi, preferably about 70 to about 100 psi, and contacts one side of mixed oxygen ion and electronic conducting membrane 30 which is maintained by heating means 35 at a desired elevated temperature of about 300° to about 800° C., preferably about 500° to about 750° C. Oxygen is withdrawn from the compartment in contact with the opposite side of mixed oxygen ion and electronic conducting membrane 30 and may be withdrawn to any suitable oxygen volume and/or analyzer means 33. The compartment in contact with the opposite side of the mixed conducting membrane is maintained at about 1 to about 14 psia, preferably at about 1 to about 5 psia. It is recognized that oxygen molecules are ionized at the interface before entering into the membrane and are converted back to molecular oxygen at the opposite surface of the mixed conducting membrane and are withdrawn from the compartment in contact with the opposite surface as molecular oxygen. We have found it most satisfactory to locate the seals for sealing the mixed conductor shape within the vessel in the cold zone to reduce thermal expansion problems in the seal area. Suitable electrode leads 34, or other leads, to the interior of vessel 31 may be provided as desired by methods well known in the art.

Figure 9:
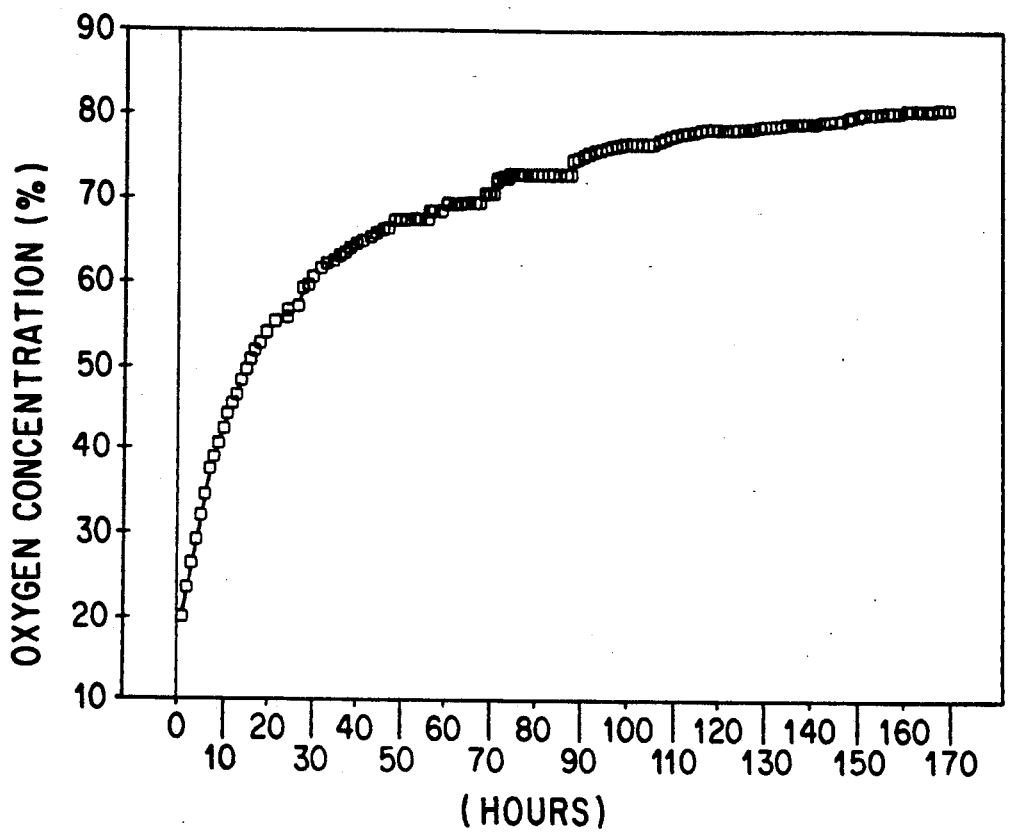
FIGS. 9 and 10 are graphs showing oxygen separation using ceramic membranes according to this invention.
Figure 10:
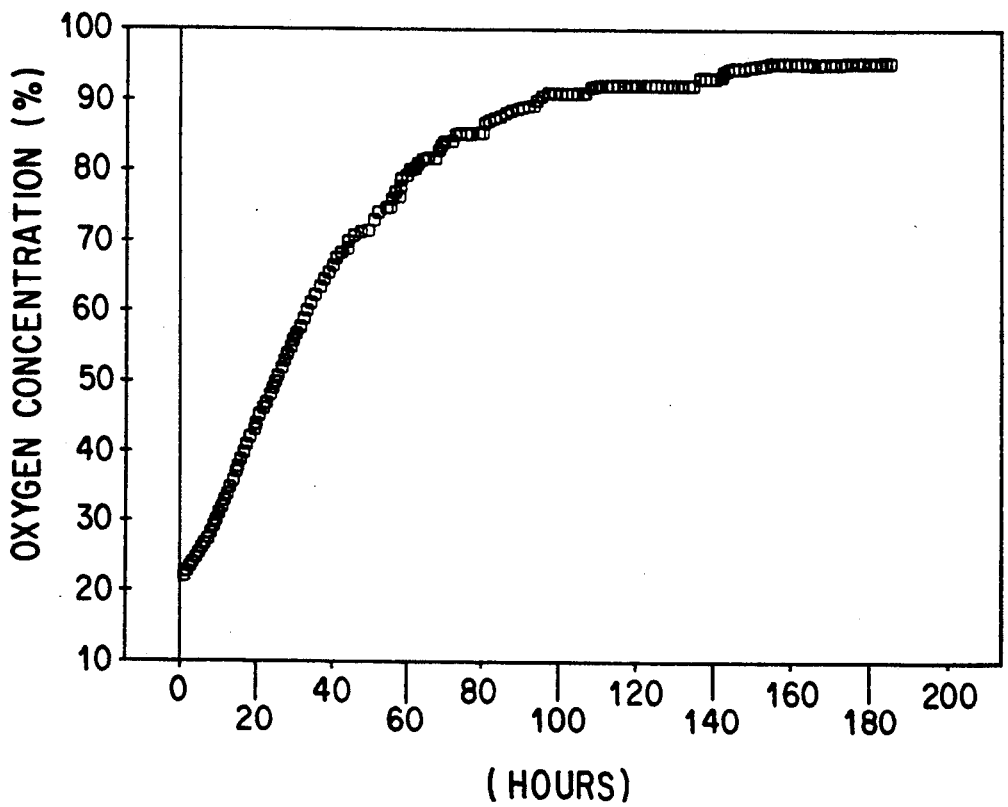

FIGS. 9 and 10 show separation of oxygen from air and equilibration of such separation with time using the apparatus shown in FIG. 8. In both cases, air under 70 psi pressure was supplied to vessel 31 and mixed conducting membrane 30 was maintained at 750° C. The pressurized air contacted the outer surface of mixed conductive tube 30 while the inner surface of mixed conductive tube 30 was maintained at ambient pressure, and molecular oxygen collected through the exit of tube 30. FIG. 9 shows oxygen separation from air using the mixed oxygen ion and electronic conducting membrane of homogeneous microstructure material $Bi_{1.5}Y_{0.3}Ti_{0.2}O_{3-\delta}$ sintered to have a density of greater than 95% theoretical and fabricated to a thickness of 1500 microns. FIG. 10 shows oxygen separation from air under the same conditions using a mixed oxygen ion and electronic conducting membrane of non-homogeneous physically mixed microstructure material $(Bi_{1.5}Y_{0.5}O_{3-\delta})_{90vol.\%}(Ag)_{10vol.\%}$ sintered to have a density of greater than 95% theoretical and fabricated to a thickness of 1730 microns. FIGS. 9 and 10 demonstrate the high efficiency of oxygen separation from air according to the present invention through a ceramic mixed conductive membrane subjected to relatively low pressure differential and at temperatures of 750° C., providing oxygen at a temperature suitable for many chemical processes, including combustion.

The ceramic mixed oxygen ion and electronic conducting membrane according to this invention may be used in catalysis of wide variety of chemical reactions involving the removal of oxygen ions from material on one side of the membrane and provision of oxygen ion to a different material of the other side of the membrane. In additional to free membranes, the membranes of this invention may be used in conjunction with other structures, such as coatings and the like for electrodes in electrochemical and electrolysis reactions. The membranes according to this invention may be coated on either or both sides with a suitable electrocatalyst to aid in the desired electrochemical reactions. For example, a thin coating of a catalyst for oxygen reduction as known to the art may be applied to the side of the ceramic membrane in contact with compressed air and a thin coating of a catalyst for oxygen evolution or fuel oxidation may be applied to the opposite side to enhance a desired oxidative chemical reaction in the presence of a chemical reactant. Contacting the faces of the ceramic membrane with the desired gas reactants may be achieved in any manner known to the art for contacting each side of the membrane with a different gas.

The following examples are set forth with specific materials and process conditions to specifically exemplify the invention and should not limit the invention in any way.

EXAMPLE I

Variously doped bismuth oxide based ceramic materials having the chemical formula $Bi_{2-x-y}Y_xCu_yO_{3-\delta}$ were prepared by mixing oxide of bismuth, oxide of yttrium, and oxide of copper in the desired proportions. The mixtures were mixed by ball milling and then calcined at 750° C. for 10 hours. After the desired phase or crystal structure was obtained, as verified by x-ray diffraction, the materials were ball milled for 24 hours to obtain a particle size of 0.5 to 1 micron. One percent binder was added to a slurry which was ball milled for another hour and dried on a hot plate or in a dry oven. After passing through a #60 mesh screen, the powder was formed into pellets by uniaxial and isostatic pressing or formed into tubes by isostatic pressing. The slurry may also be used to tape cast thick films or membranes. The green parts were then fired at 900° C. for 5 hours in air to sinter and achieve a density of greater than 95% of the theoretical value.

Figure 4:
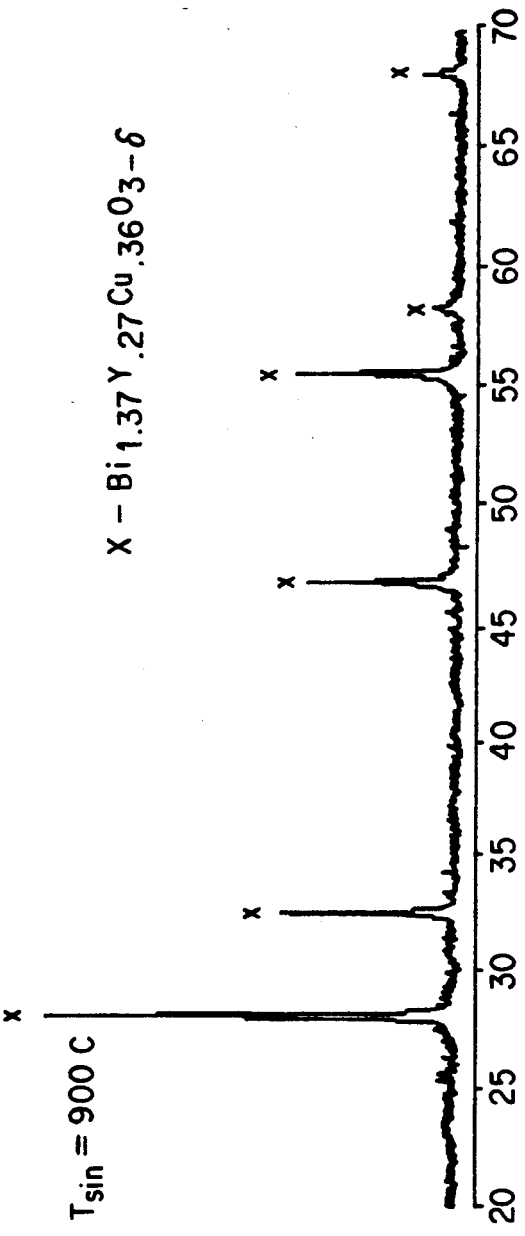

FIG. 1 is an x-ray diffraction pattern of $Bi_{1.5}Y_{0.5}O_{3-\delta}$ which had been sintered at 900° C. FIG. 2 is an x-ray diffraction pattern of a physical mixture of $Bi_{1.5}Y_{0.5}O_{3-\delta}$ and $Cu_2O$ before calcination showing the peaks for the separate compounds. FIGS. 3 and 4 are x-ray diffraction patterns for materials made by the process of this Example, $Bi_{1.5}Y_{0.3}Cu_{0.2}O_{3-\delta}$ and $Bi_{1.37}Y_{0.27}Cu_{0.36}O_{3-\delta}$, respectively, which indicate that both dopants essentially substitute for bismuth cations in the lattice structure, resulting in a uniform solid solution.

EXAMPLE II

A non-homogeneous physically mixed microstructure material was prepared by first preparing yttria stabilized bismuth oxides by mixing oxide of bismuth and oxide of yttrium in the desired proportions and calcining the mixture at 800° C. for 10 hours. After the desired phase or crystal structure was obtained and verified by x-ray diffraction, the calcined powder was mixed with the desired amount of $Ag_2O$ powder and ball milled for 24 hours to a particle size of 0.5 to 1 micron. One percent binder was added to a slurry of the powder mixture which was milled for an additional hour and then dried on a hot plate or a dry oven, screened, formed into pellets or other desired forms, as described in Example I, and then the green parts were fired at 950° C. for 5 hours in air to achieve density of greater than 95% of the theoretical value.

FIG. 5 is a photomicrograph at 800× of $(Bi_{1.5}Y_{0.5}O_{3-\delta})_{90wt\%}(Ag)_{10wt\%}$ as prepared in this Example showing the non-homogeneous physically mixed microstructure matrix $Bi_{1.5}Y_{0.5}O_{3-\delta}$ phase as black and the Ag phase as white.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. Mixed oxygen ion and electronic conducting bismuth oxide based ceramic material having high ambipolar conductivity having a homogeneous microstructure of a solid solution or a compound having the chemical formulation $Bi_{2-x-y}M'_xM_yO_{3-\delta}$ wherein M' is selected from the group consisting of Er, Y, Tm, Yb, Tb, Lu, Nd, Sm, Dy, Zr, Hf, Th, Ta, Nb, Pb, Sn, In, Ca, Sr, La and mixtures thereof; M is a variable valence metal selected from the group consisting of Mn, Fe, Co, Ni, Cu and mixtures thereof; x is a number of 0.0 to a positive number of about 0.6; is a positive number of about 0.02 to about 0.4; and $\delta$ is a number of 0 to a positive or negative number of about 0.3 to satisfy valence requirements.

2. Mixed oxygen ion and electronic conducting ceramic material according to claim 1 wherein M is selected from the group consisting of Co, Ni, Cu and mixtures thereof.

3. Mixed oxygen ion and electronic conducting ceramic material according to claim 1 wherein M' is selected from the group consisting of Er and Y.

4. Mixed oxygen ion and electronic conducting ceramic material according to claim 1 wherein x is about 0.2 to about 0.5 and y is about 0.02 to about 0.3.

5. Mixed oxygen ion and electronic conducting ceramic material according to claim 1 wherein M is selected from the group consisting of Co, Ni, Cu and mixtures thereof; M' is selected from the group consisting of Er and Y; x is about 0.2 to about 0.5 and y is about 0.02 to about 0.3.

6. Mixed oxygen ion and electronic conducting ceramic material according to claim 1 having ambipolar conductivity greater than about $5 \times 10^{-2}$ Ohm$^{-1}$cm$^{-1}$ at about 750° C.

7. A mixed oxygen ion and electronic conducting gas impervious ceramic membrane having high ambipolar conductivity for oxygen ion transport having a homogeneous microstructure material of a solid solution or a compound having a chemical formulation of $Bi_{2-x-y}M'_xM_yO_{3-\delta}$ wherein M' is selected from the group consisting of Er, Y, Tm, Yb, Tb, Lu, Nd, Sm, Dy, Zr, Hf, Th, Ta, Nb, Pb, Sn, In, Ca, Sr, La and mixtures thereof; M is a variable valence metal selected from the group consisting of Mn, Fe, Co, Ni, Cu and mixtures thereof; x is a number of 0.0 to about 0.6; y is a positive number of about 0.02 to about 0.4; and $\delta$ is a number of 0 to a positive or negative number of about 0.3 to satisfy valence requirements.

8. A mixed oxygen ion and electronic conducting gas impervious ceramic membrane according to claim 7 having a thickness of about 1 micron to about 2000 microns.

9. A mixed oxygen ion and electronic conducting gas impervious ceramic membrane according to claim 7 having a thickness of about 1 micron to about 50 microns.

10. A mixed oxygen ion and electronic conducting gas impervious ceramic membrane according to claim 7 wherein M is selected from the group consisting of Co, Ni, Cu and mixtures thereof.

11. A mixed oxygen ion and electronic conducting gas impervious ceramic membrane according to claim 7 wherein M' is selected from the group consisting of Er and Y.

12. A mixed oxygen ion and electronic conducting gas impervious ceramic membrane according to claim 7 wherein x is about 0.2 to about 0.5; y is about 0.02 to about 0.3; z is about 0.05 to about 0.2; and w is about 0.05 to about 0.2.

13. A mixed oxygen ion and electronic conducting gas impervious ceramic membrane according to claim 7 wherein M is selected from the group consisting of Co, Ni, Cu and mixtures thereof; M' is selected from the group consisting of Er and Y; x is about 0.2 to about 0.5 and y is about 0.02 to about 0.3.

14. A mixed oxygen ion and electronic conducting gas impervious ceramic membrane according to claim 7 having ambipolar conductivity greater than about $5 \times 10^{-2}$ Ohm$^{-1}$cm$^{-1}$ at about 750° C.

15. A process for oxygen separation from an oxygen containing gas comprising contacting one side of a gas impermeable mixed oxygen ion and electronic conducting ceramic membrane with said oxygen containing gas concurrently with withdrawing oxygen ions from a second opposite side of said membrane, said mixed oxygen ion and electronic conducting ceramic membrane having high ambipolar conductivity for oxygen ion and electronic transport having a homogeneous microstructure of a solid solution or a compound having a chemical formulation $Bi_{2-x-y}M'_xM_yO_{3-\delta}$ wherein M' is selected from the group consisting of Er, Y, Tm, Yb, Tb, Lu, Nd, Sm, Dy, Zr, Hf, Th, Ta, Nb, Pb, Sn, In, Ca, Sr, La and mixtures thereof; M is a variable valence metal selected from the ground consisting of Cr, Mn, Co, Ni, Cu and mixtures thereof; x is a positive number of 0.0 to about 0.6; y is a positive number of about 0.02 to about 0.4; and $\delta$ is a number of 0 to a positive or negative number of about 0.3 to satisfy valence requirements.

16. A process for oxygen separation according to claim 15 wherein said ceramic membrane has a thickness of about 1 micron to about 2,000 microns.

17. A process for oxygen separation according to claim 15 wherein said ceramic membrane has a thickness of about 1 micron to 50 microns.

18. A process for oxygen separation according to claim 15 wherein said ceramic membrane is maintained at a temperature of about 300° to about 800° C.

19. A process for oxygen separation according to claim 15 wherein said oxygen containing gas is air.

20. A process for oxygen separation according to claim 15 wherein M is selected from the group consisting of Co, Ni, Cu and mixtures thereof.

21. A process for oxygen separation according to claim 15 wherein said ambipolar conductivity is greater than about $5 \times 10^{-2}$ Ohm$^{-1}$cm$^{-1}$ at about 750° C.

22. A process for oxygen separation according to claim 15 wherein said oxygen containing gas at said one side of said gas impermeable mixed oxygen ion and electronic conducting ceramic membrane is maintained at a pressure of about 25 to about 300 psi.

23. A process for oxygen separation according to claim 22 wherein the compartment in contact with said opposite side of said mixed oxygen ion and electronic conducting membrane is maintained at a pressure of about 1 to about 14 psia.

24. A process for oxygen separation according to claim 15 wherein M' is selected from the group consisting of Er and y; x is about 0.2 to about 0.5 and y is about 0.02 to about 0.3.

25. A process for mixed oxygen ion and electronic conductance across a gas impermeable mixed oxygen ion and electronic conducting ceramic membrane comprising contacting one side of said membrane with an oxygen containing gas and withdrawing oxygen ions from a second opposite side of said membrane, oxygen ion conductance being driven without application of external electric potential by electronic conductance across said membrane having a homogeneous microstructure of a solid solution or a compound having a chemical formulation of $Bi_{2-x-y}M'_xM_yO_{3-\delta}$ wherein M' is selected from the group consisting of Er, Y, Tm, Yb, Tb, Lu, Nd, Sm, Dy, Zr, Hf, Tb, Ta, Nb, Pb, Sn, In, Ca, Sr, La and mixtures thereof; M is selected from a variable valence group consisting of Cr, Mn, Fe, Co, Ni, Cu and mixtures thereof; x is a positive number of 0.0 to about 0.6; y is a positive number of about 0.02 to about 0.4; and $\delta$ is a number of 0 to a positive or negative number of about 0.3 to satisfy valence requirements.

26. A process for mixed oxygen ion and electronic conductance across a gas impervious membrane according to claim 25 wherein said ceramic membrane has a thickness of about 1 micron to about 2,000 microns.

27. A process for mixed oxygen ion and electronic conductance across a gas impervious membrane according to claim 25 wherein said ceramic membrane has a thickness of about 1 micron to about 50 microns.

28. A process for mixed oxygen ion and electronic conductance across a gas impervious membrane according to claim 25 wherein said ceramic membrane is maintained at a temperature of about 300° to about 800° C.

29. A process for mixed oxygen ion and electronic conductance across a gas impervious membrane according to claim 25 wherein said oxygen containing gas is air.

30. A process for mixed oxygen ion and electronic conductance across a gas impervious membrane according to claim 25 wherein M' is selected from the group consisting of Er and Y; x is about 0.2 to about 0.5 and y is about 0.02 to about 0.3.

31. A process for oxygen ion and electronic conductance across a gas impervious membrane according to claim 25 wherein M is selected from the group consisting of Co, Ni, Cu and mixtures thereof.

32. A process for oxygen ion and electronic conductance across a gas impervious membrane according to claim 25 wherein said ambipolar conductivity is greater than about $5 \times 10^{-2}$ Ohm$^{-1}$cm$^{-1}$ at about 750° C.

33. A process for oxygen ion and electronic conductance across a gas impervious membrane according to claim 25 wherein said oxygen containing gas at said one side of said gas impermeable mixed oxygen ion and electronic conducting ceramic membrane is maintained at a pressure of about 25 to about 200 psi.

34. A process for oxygen ion and electronic conductance across a gas impervious membrane according to claim 25 wherein the compartment in contact with said opposite side of said mixed oxygen ion and electronic conducting membrane is maintained at a pressure of about 1 to about 14 psia.

* * * * *